US009076320B2

(12) United States Patent
Hong et al.

(10) Patent No.: US 9,076,320 B2
(45) Date of Patent: Jul. 7, 2015

(54) APPARATUS AND METHOD FOR PROCESSING SENSOR SIGNAL

(75) Inventors: Sang Gi Hong, Daejeon (KR); Nae-soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 330 days.

(21) Appl. No.: 13/590,316

(22) Filed: Aug. 21, 2012

(65) Prior Publication Data

US 2013/0176122 A1 Jul. 11, 2013

(30) Foreign Application Priority Data

Jan. 6, 2012 (KR) ........................ 10-2012-0001968

(51) Int. Cl.

| | |
|---|---|
| ***G08B 23/00*** | (2006.01) |
| ***B60R 25/10*** | (2013.01) |
| ***G08B 29/00*** | (2006.01) |
| ***G08B 13/00*** | (2006.01) |
| ***G08B 29/18*** | (2006.01) |
| ***G08B 29/02*** | (2006.01) |
| ***G08B 29/16*** | (2006.01) |
| *G08B 13/19* | (2006.01) |

(52) U.S. Cl.

CPC ............ *G08B 29/185* (2013.01); *G08B 29/183* (2013.01); *G08B 29/02* (2013.01); *G08B 29/16* (2013.01); *G08B 13/19* (2013.01)

(58) Field of Classification Search

CPC .... G08B 29/185; G08B 29/183; G08B 29/02; G08B 25/008; G08B 17/12; G08B 13/1654; G08B 29/26; G08B 27/005; G08B 29/18; G08B 13/2494; G08B 13/19

USPC ............ 340/501, 584, 567, 426.24, 541, 565, 340/573.1, 425.5, 511, 522, 578, 506, 340/426.26, 545.3; 73/432.1, 865.8; 342/107, 28, 174, 114, 106; 367/93, 367/94; 180/287; 250/338.1, 339.11, 250/339.14, 341.8

See application file for complete search history.

(56) References Cited

U.S. PATENT DOCUMENTS

| | | | | |
|---|---|---|---|---|
| 5,504,473 | A * | 4/1996 | Cecic et al. | 340/541 |
| 5,793,288 | A * | 8/1998 | Peterson et al. | 340/567 |
| 5,886,622 | A * | 3/1999 | Snyder | 340/426.26 |
| 2004/0140892 | A1* | 7/2004 | Hanood | 340/511 |
| 2008/0218361 | A1* | 9/2008 | Parker et al. | 340/584 |

* cited by examiner

*Primary Examiner* — Mirza Alam

(74) *Attorney, Agent, or Firm* — Rabin & Berdo, P.C.

(57) ABSTRACT

A sensor signal processing apparatus receives a sensor signal from a sensor in order to detect an object, determines whether an object exists from the received sensor signal, and if an object exists, the sensor signal processing apparatus generates an alarm signal, and it removes an alarm signal corresponding to a false alarm signal from the alarm signal based on at least one of a length and energy of the alarm signal.

14 Claims, 10 Drawing Sheets

APPARATUS AND METHOD FOR PROCESSING SENSOR SIGNAL

CROSS-REFERENCE TO RELATED APPLICATION

This application claims priority to and the benefit of Korean Patent Application No. 10-2012-0001968 filed in the Korean Intellectual Property Office on Jan. 6, 2012, the entire contents of which are incorporated herein by reference.

BACKGROUND OF THE INVENTION (a) Field of the Invention

The present invention relates to a method and apparatus for processing a sensor signal. More particularly, the present invention relates to a method and apparatus for processing a sensor signal that detects an object using a passive infrared sensor.

(b) Description of the Related Art

A passive infrared (PIR) sensor is generally used for detecting a human body or a moving object or for controlling an apparatus that is related to detection of a human body or a moving object. Particularly, the PIR sensor is mounted at a specific space such as an entrance door, detects whether a moving object exists, and is used for automatic door opening, automatic turn-on control of lighting, and human body detection for a solitary elderly person.

In this way, an existing PIR sensor is much used for detecting only whether an object exists, and is generally used indoors.

The PIR sensor may detect an external moving object, but because false alarms frequently occur by environment noise such as wind, humidity, and irregular reflection, the PIR sensor cannot provide reliable detection performance.

SUMMARY OF THE INVENTION

The present invention has been made in an effort to provide a method and apparatus for processing a sensor signal having advantages of reducing a false alarm probability when detecting a moving object outdoors using a PIR sensor.

An exemplary embodiment of the present invention provides a sensor signal processing apparatus that detects an object using a sensor. The sensor signal processing apparatus includes a signal receiving unit, a detection unit, and a false alarm signal removing unit The signal receiving unit receives a sensor signal from the sensor. The detection unit determines whether an object exists using the sensor signal and generates an alarm signal if an object exists. The false alarm signal removing unit removes an alarm signal corresponding to a false alarm signal from the alarm signal.

The false alarm signal removing unit may remove an alarm signal corresponding to a false alarm signal from the alarm signal based on at least one of a length and energy of the alarm signal.

The false alarm signal removing unit may set a threshold value from a length of a first alarm signal that is generated using a sensor signal that it receives from the sensor in an initial condition for an initialization period, compare a length of a second alarm signal that is generated using a sensor signal that it receives from the sensor with a threshold value after the initialization period, and determine a second alarm signal having a shorter length than the threshold value as the false alarm signal.

The false alarm signal removing unit may set the threshold value using an average and a standard deviation of a length of the first alarm signal.

The false alarm signal removing unit may set a threshold value from energy of the first alarm signal that is generated using a sensor signal that it receives from the sensor in an initial condition for an initialization period, compare energy of a second alarm signal that is generated using a sensor signal that it receives from the sensor with the threshold value after the initialization period, and determine a second alarm signal having smaller energy than the threshold value as the false alarm signal.

The false alarm signal removing unit may set the threshold value using an average and a standard deviation of energy of the first alarm signal.

Another embodiment of the present invention provides a method in which a sensor signal processing apparatus processes a sensor signal of a sensor in order to detect an object. The method includes: receiving a sensor signal from the sensor; generating, when it is determined that the object exists from the sensor signal, an alarm signal; and removing an alarm signal corresponding to a false alarm signal from the alarm signal.

The removing of an alarm signal may include determining the false alarm signal based on at least one of a length and energy of the alarm signal.

DETAILED DESCRIPTION OF THE EMBODIMENTS

Figure 1:
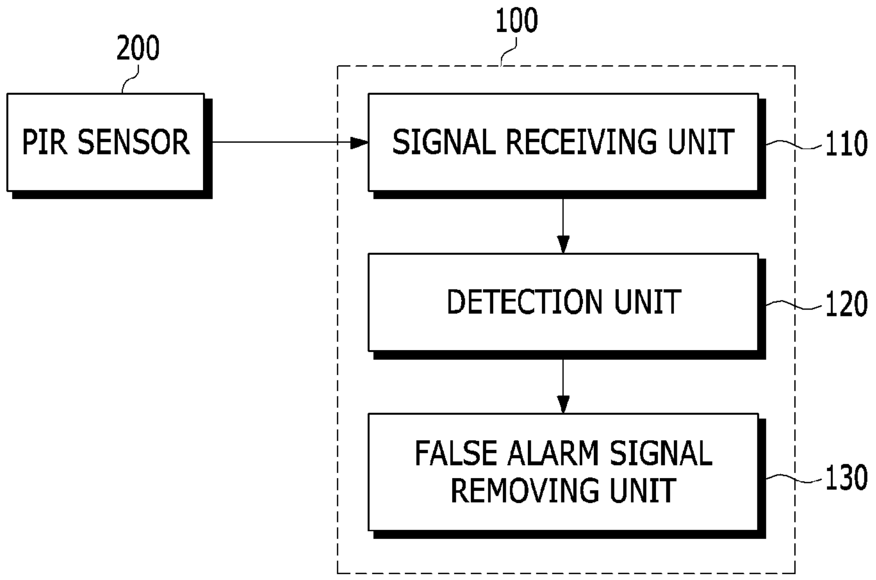
FIG. 1 is a block diagram illustrating a configuration of a sensor signal processing apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for processing a sensor signal according to an exemplary embodiment of the present invention will be described in detail with reference to the drawings.

FIG. 1 is a block diagram illustrating a configuration of a sensor signal processing apparatus according to an exemplary embodiment of the present invention.

Referring to FIG. 1, a sensor signal processing apparatus 100 includes a signal receiving unit 110, a detection unit 120, and a false alarm signal removing unit 130.

The signal receiving unit 110 receives a sensor signal from a passive infrared (PIR) sensor 200.

The detection unit 120 determines whether a moving object exists using a sensor signal, and if a moving object exists, the detection unit 120 generates an alarm signal.

The false alarm signal removing unit 130 removes a false alarm signal from the alarm signal using a sensor signal. The false alarm signal is a signal that is generated when it is determined that a moving object exists by an external environment factor in a situation in which a moving object does not actually exist.

The false alarm signal removing unit 130 may remove a false alarm signal based on a length of the alarm signal and remove a false alarm signal based on energy of the alarm signal. Further, the false alarm signal removing unit 130 may remove a false alarm signal based on a length and energy of the alarm signal.

Figure 2:
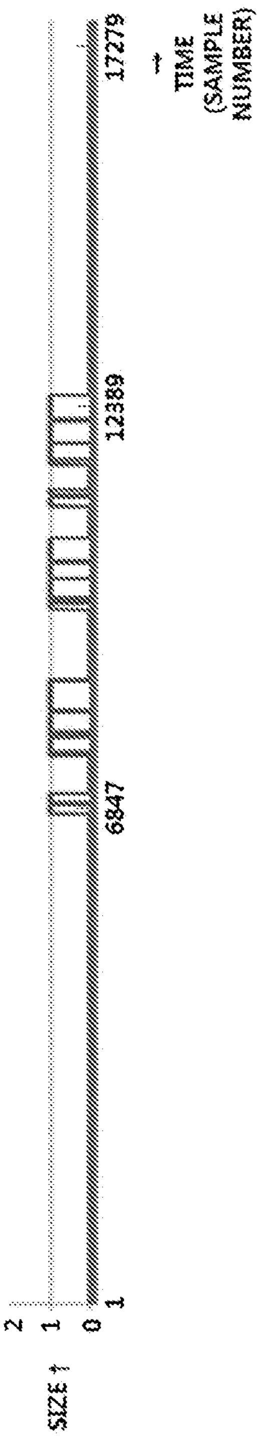
FIGS. 2 to 4 each are diagrams illustrating an example of a pattern of an alarm signal according to an exemplary embodiment of the present invention.
Figure 3:
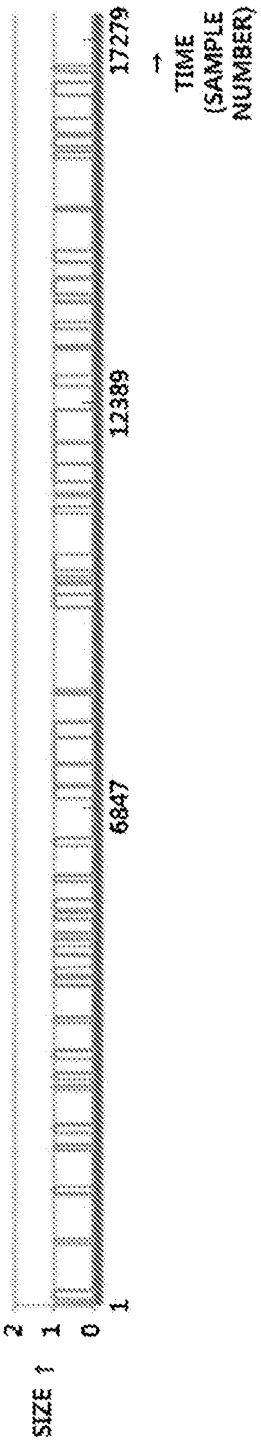
Figure 4:
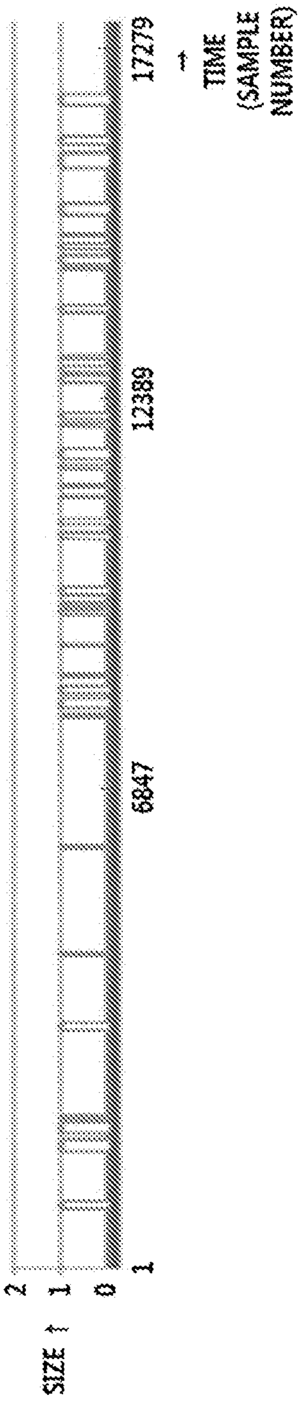

FIGS. 2 to 4 are each diagrams illustrating an example of a pattern of an alarm signal according to an exemplary embodiment of the present invention.

As shown in FIGS. 2 to 4, an alarm signal that is generated from a sensor signal of the PIR sensor 200 may be displayed with three patterns.

When it is assumed that three vehicles pass the front of the PIR sensor 200, the detection unit 120 generates an alarm signal of FIG. 2 with a sensor signal of the PIR sensor 200 in a state in which external environment noise does not exist.

However, when external environment noise exists, the detection unit 120 generates an alarm signal of FIG. 3 by an influence of external environment noise. That is, a noise signal is included in a sensor signal by an influence of external environment noise, and the detection unit 120 falsely determines that a moving object exists by the noise signal that is included in the sensor signal and generates an alarm signal including a false alarm signal that is shown in FIG. 4. Therefore, the false alarm signal removing unit 130 of the sensor signal processing apparatus 100 removes a false alarm signal of FIG. 4 from an alarm signal that is generated by a sensor signal, thereby improving detection performance of the sensor signal processing apparatus 100.

Figure 5:
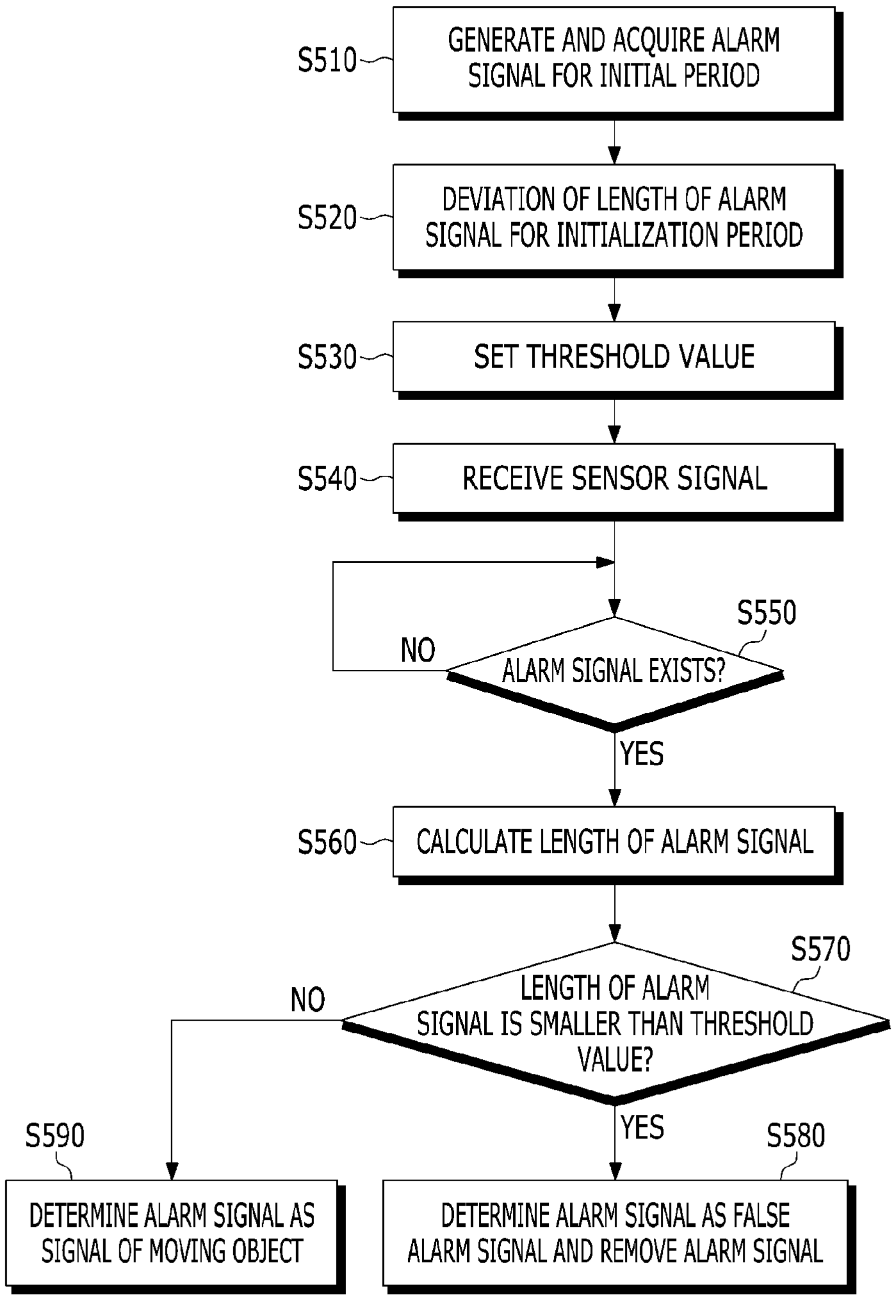
FIG. 5 is a flowchart illustrating a method of removing a false alarm signal with a false alarm signal removing unit according to a first exemplary embodiment of the present invention.
Figure 6:
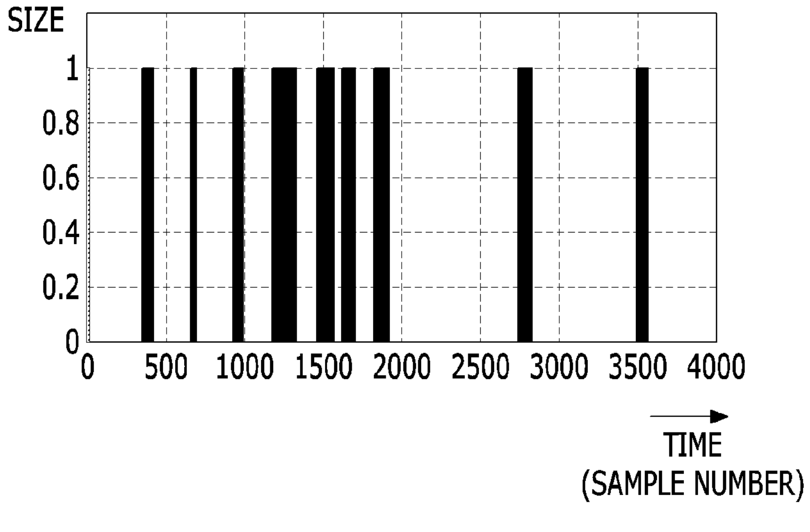
FIG. 6 is a graph illustrating an example of an alarm signal in an initial condition.
Figure 7:
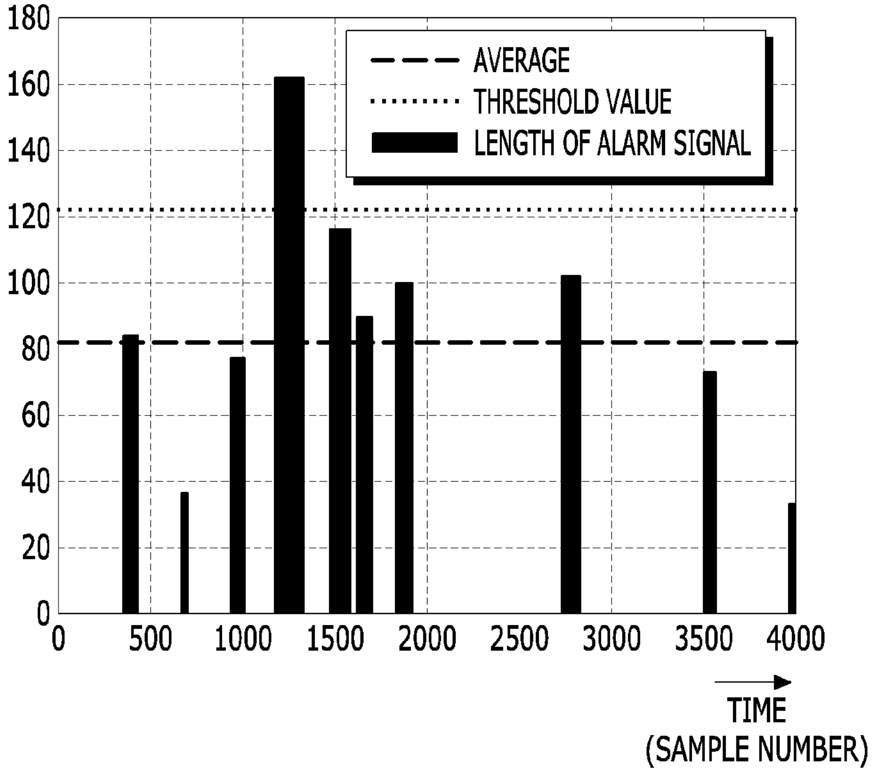
FIG. 7 is a graph illustrating a length of an alarm signal according to an exemplary embodiment of the present invention.

FIG. 5 is a flowchart illustrating a method of removing a false alarm signal from the false alarm signal removing unit according to a first exemplary embodiment of the present invention. FIG. 6 is a graph illustrating an example of an alarm signal in an initial condition, and FIG. 7 is a graph illustrating a length of an alarm signal according to an exemplary embodiment of the present invention.

Referring to FIG. 5, the false alarm signal removing unit 130 generates and acquires an alarm signal using a sensor signal of the PIR sensor 200 that it receives for an initialization period that is determined in an initial condition (S510). Here, the initial condition may be an environment condition in which a moving object corresponding to a target does not exist and in which only noise exists. The alarm signal that is generated and acquired at step S510 may be displayed as shown in FIG. 6.

The false alarm signal removing unit 130 calculates an average and a standard deviation of a length of an alarm signal for an initialization period (S520). The length of an alarm signal represents the total sample number of an alarm signal.

The false alarm signal removing unit 130 sets a threshold value using an average and a standard deviation of the calculated alarm signal length (S530). The threshold value may be determined according to setting of a false alarm rate in the sensor signal processing apparatus 100. For example, a threshold value may be determined by a "false alarm average+false alarm standard deviation". If previous information about false alarm statistics exists in an initial condition, the false alarm signal removing unit 130 does not perform steps S510-S530 and sets a threshold value using previous information about false alarm statistics. In this case, the false alarm signal removing unit 130 adaptively changes a false alarm rate regardless of an influence of an environment by periodically updating false alarm statistics.

Thereby, after a threshold value is set, the false alarm signal removing unit 130 receives a sensor signal from the PIR sensor 200 (S540).

The false alarm signal removing unit 130 determines whether an alarm signal exists in the sensor signal (S550), and if an alarm signal exists in the sensor signal, the false alarm signal removing unit 130 calculates a length of the alarm signal (S560). For example, when a length of an alarm signal is calculated with the alarm signal that is shown in FIG. 6, the length of an alarm signal may be displayed as shown in FIG. 7.

The false alarm signal removing unit 130 determines whether a length of the alarm signal is smaller than a threshold value (S570), and if a length of the alarm signal is smaller than a threshold value, the false alarm signal removing unit 130 determines the alarm signal as a false alarm signal and removes the alarm signal (S580).

If a length of the alarm signal is larger than a threshold value, the false alarm signal removing unit 130 determines the alarm signal as a signal of a moving object (S590).

The alarm signal that is shown in FIG. 6 is an alarm signal that is generated in an environment condition in which a moving object does not exist and in which only noise exists and thus the alarm signal corresponds to a false alarm signal. In this case, as shown in FIG. 7, when a threshold value is set, the false alarm signal removing unit 130 determines an alarm signal in which a length of the alarm signal is smaller than that of a threshold value as a false alarm signal and removes the alarm signal. Therefore, because only one false alarm signal actually remains, a false alarm rate can be remarkably reduced.

Figure 8:
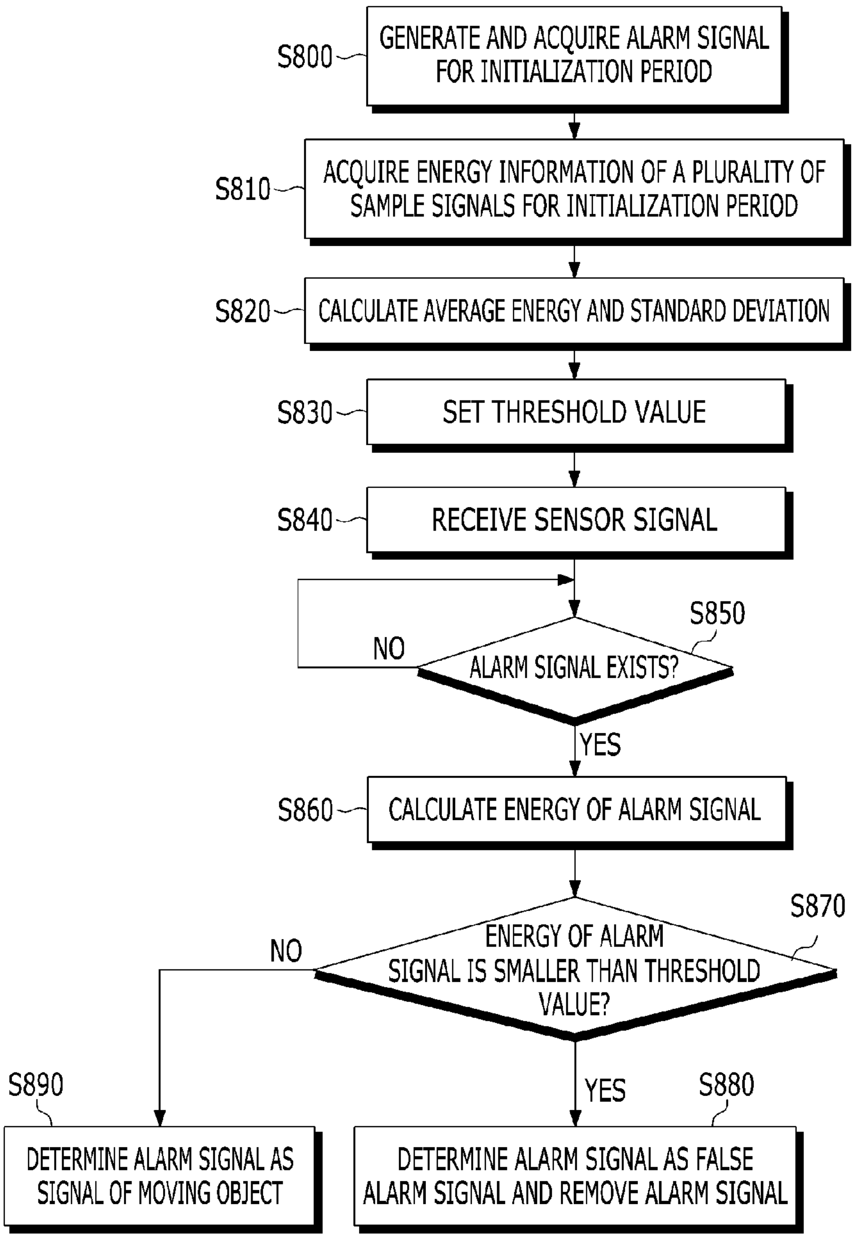
FIG. 8 is a flowchart illustrating a method of removing a noise signal with a noise removing unit according to a second exemplary embodiment of the present invention.
Figure 9:
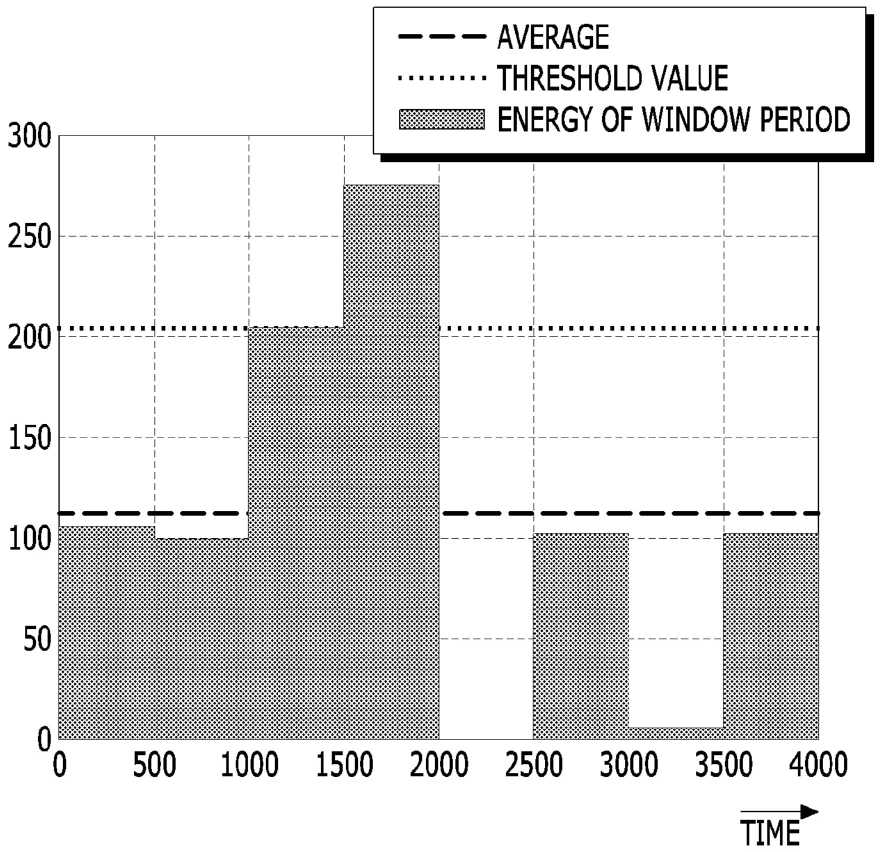
FIG. 9 is a graph illustrating energy of an alarm signal according to an exemplary embodiment of the present invention.

FIG. 8 is a flowchart illustrating a method of removing a noise signal from a noise removing unit according to a second exemplary embodiment of the present invention, and FIG. 9 is a graph illustrating energy of an alarm signal according to an exemplary embodiment of the present invention.

Referring to FIG. 8, the false alarm signal removing unit 130 generates and acquires an alarm signal using a sensor signal of the PIR sensor 200 that it receives from the PIR sensor 200 in an initial condition for an initialization period (S800). Here, an environment condition may be an environment condition in which a moving object does not exist and in which only noise exists, and the alarm signal that is generated and acquired at step S800 may be displayed as shown in FIG. 6.

The false alarm signal removing unit 130 acquires energy information of a plurality of sample signals that are generated by sampling an alarm signal (S810). In this case, the false alarm signal removing unit 130 may include a plurality of queues (not shown), and energy information about a plurality of sample signals of each alarm signal is stored at each queue.

For example, energy information about sample signals of the M number may be stored at one queue, and when queues of the N number exist, the false alarm signal removing unit 130 may acquire energy information about sample signals of the N*M number for an initialization period.

After the false alarm signal removing unit 130 acquires energy information about a plurality of sample signals of each alarm signal, the false alarm signal removing unit 130 calculates average energy and a standard deviation of the acquired sample signal (S820).

The false alarm signal removing unit 130 sets a threshold value using the calculated average energy and standard deviation (S830). The threshold value may be determined according to setting of a false alarm rate in the sensor signal processing apparatus 100. For example, the threshold value may be set as "energy average+energy standard deviation".

Next, the false alarm signal removing unit 130 receives a sensor signal from the PIR sensor 200 (S840).

When a sensor signal is received in a window period, the false alarm signal removing unit 130 determines whether an alarm signal exists in the sensor signal (S850), and if an alarm signal exists in the sensor signal, the false alarm signal removing unit 130 calculates energy of an alarm signal for a window period (S860). Here, energy of the alarm signal indicates the number of alarm signals in the sensor signal. For example, energy of the alarm signal represents the total number of samples in which an alarm signal is 1 for a specific period in FIG. 6, and when energy of the alarm signal is calculated from the alarm signal that is shown in FIG. 6, energy of the alarm signal may be displayed as shown in FIG. 9.

The false alarm signal removing unit 130 determines whether energy of the alarm signal is smaller than a threshold value (S870), and if energy of the alarm signal is smaller than a threshold value, the false alarm signal removing unit 130 determines the alarm signal as a false alarm signal and removes the alarm signal (S880).

If energy of the alarm signal is equal to or larger than a threshold value, the false alarm signal removing unit 130 determines the alarm signal as a signal of a moving object (S890).

When the alarm signal is determined as a false alarm signal, the false alarm signal removing unit 130 changes the oldest cue value to a value of a present window period and updates a threshold value.

As described above, the alarm signal that is shown in FIG. 6 is an alarm signal that is generated and acquired in an environment condition in which a moving object does not exist and in which only noise exists, and thus the alarm signal corresponds to a false alarm signal. In this case, as shown in FIG. 9, when a threshold value is set, the false alarm signal removing unit 130 determines an alarm signal in which a length of the alarm signal is smaller than a threshold value as a false alarm signal and removes the alarm signal. Therefore, because only one false alarm signal actually remains, a false alarm rate can be remarkably reduced.

Hereinafter, effects of a method of removing a false alarm signal according to an exemplary embodiment of the present invention will be described with reference to FIGS. 10 and 11.

Figure 10:
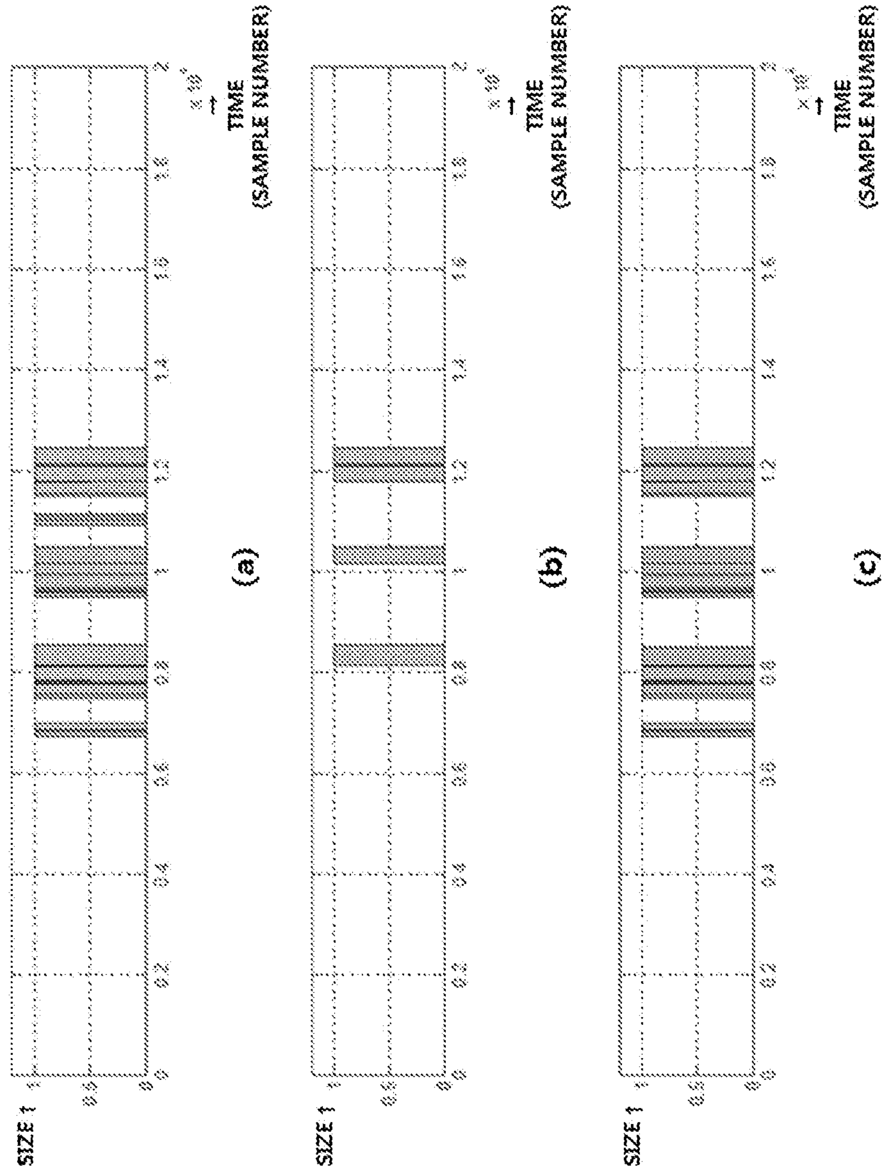
FIG. 10 is a graph illustrating a removed false alarm signal in a condition in which only a moving object exists without noise.
Figure 11:
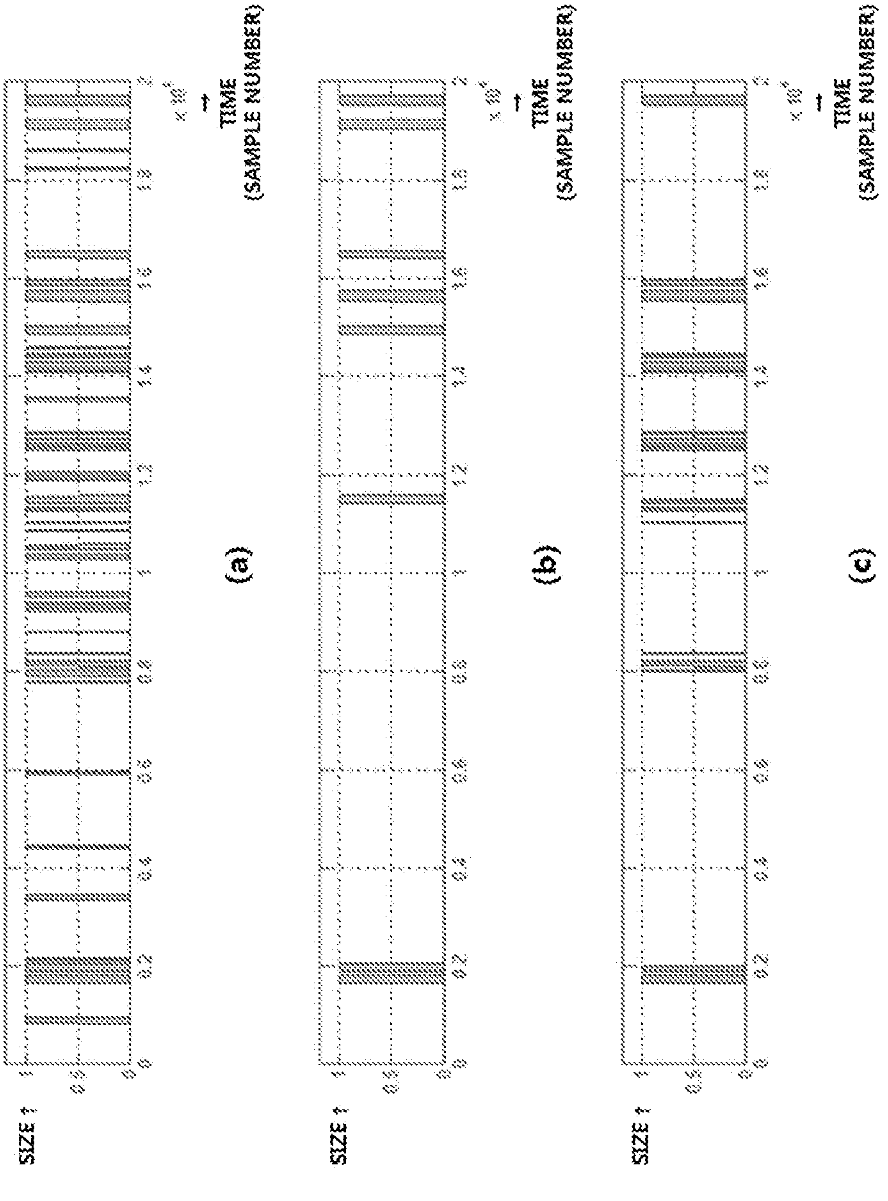
FIG. 11 is a graph illustrating a removed false alarm signal in a condition in which only noise exists without a moving object.

FIG. 10 shows graphs illustrating a removed false alarm signal in a condition in which only a moving object exists without noise, and FIG. 11 shows graphs illustrating a removed false alarm signal in a condition in which only noise exists without a moving object.

First, referring to FIG. 10, in a condition in which noise does not exist, when three vehicles pass the front of the PIR sensor 200, if an alarm signal of (a) of FIG. 10 is generated, a result in which a false alarm signal is removed based on a length of the alarm signal is shown in (b) of FIG. 10. That is, in a condition in which noise does not exist, even if a false alarm signal is removed based on a length of the alarm signal, it can be seen that only an alarm signal corresponding to three vehicles remains.

Further, a result in which a false alarm signal is removed based on energy of the alarm signal is shown in (c) of FIG. 10. It can be seen through (c) of FIG. 10 that an alarm signal corresponding to three vehicles remains.

Referring to FIG. 11, in a condition in which only noise exists without a moving object, when an alarm signal of (a) of FIG. 11 is generated, a result in which a false alarm signal is removed based on a length of the alarm signal is shown in (b) of FIG. 11. That is, in a condition in which only noise exists, the alarm signal that is shown in (a) of FIG. 11 corresponds to a false alarm signal. In this case, when a false alarm signal is removed based on a length of the alarm signal, it can be seen that a plurality of false alarm signals are removed, as shown in (b) of FIG. 11.

Further, a result in which a false alarm signal is removed based on energy of the alarm signal is shown in (c) of FIG. 11. Comparing (c) with (a) of FIG. 11, it can be seen that a plurality of false alarm signals are removed.

According to an exemplary embodiment of the present invention, reliable detection performance can be provided outdoors using a PIR sensor that is usually difficult to apply outdoors due to occurrence of false alarm according to an environment change.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sensor signal processing apparatus that detects an object using a sensor, the sensor signal processing apparatus comprising:

a signal receiving unit that receives a sensor signal from the sensor;

a detection unit that determines whether an object exists using the sensor signal and that generates an alarm signal if an object exists; and a false alarm signal removing unit that removes an alarm signal corresponding to a false alarm signal from the alarm signal, wherein the false alarm signal removing unit sets a threshold value from a length of a first alarm signal that is generated using a sensor signal that it receives from the sensor in an initial condition for an initialization period, compares a length of a second alarm signal that is generated using a sensor signal that it receives from the sensor with a threshold value after the initialization period, and determines a second alarm signal having a shorter length than the threshold value as the false alarm signal.

2. The sensor signal processing apparatus of claim 1, wherein the false alarm signal removing unit removes an alarm signal corresponding to a false alarm signal from the alarm signal based on at least one of a length and energy of the alarm signal.

3. The sensor signal processing apparatus of claim 1, wherein the false alarm signal removing unit sets the threshold value using an average and a standard deviation of a length of the first alarm signal.

4. The sensor signal processing apparatus of claim 1, wherein the initial condition comprises an environment condition in which only noise exists without the object.

5. A sensor signal processing apparatus that detects an object using a sensor, the sensor signal processing apparatus comprising:

a signal receiving unit that receives a sensor signal from the sensor;

a detection unit that determines whether an object exists using the sensor signal and that generates an alarm signal if an object exists; and a false alarm signal removing unit that removes an alarm signal corresponding to a false alarm signal from the alarm signal, wherein the false alarm signal removing unit sets a threshold value from energy of a first alarm signal that is generated using the sensor signal that it receives from the sensor in an initial condition for an initialization period, compares energy of a second alarm signal that is generated using the sensor signal that it receives from the sensor with the threshold value after the initialization period, and determines a second alarm signal having smaller energy than the threshold value as the false alarm signal.

6. The sensor signal processing apparatus of claim 5, wherein the false alarm signal removing unit sets the threshold value using an average and a standard deviation of energy of the first alarm signal.

7. The sensor signal processing apparatus of claim 5, wherein the initial condition comprises an environment condition in which only noise exists without the object.

8. A method in which a sensor signal processing apparatus processes a sensor signal of a sensor in order to detect an object, the method comprising:

receiving a sensor signal from the sensor;

generating, when it is determined that the object exists from the sensor signal, an alarm signal; and removing an alarm signal corresponding to a false alarm signal from the alarm signal, wherein the removing of an alarm signal comprises:

setting a threshold value using a sensor signal that it receives from the sensor in an initial condition for an initialization period;

calculating a length of at least one first alarm signal that is generated using a sensor signal that is received from the sensor after the initialization period; and determining a first alarm signal having a shorter length than the threshold value as the false alarm signal.

9. The method of claim 8, wherein the removing of an alarm signal comprises determining the false alarm signal based on at least one of a length and energy of the alarm signal.

10. The method of claim 8, wherein the setting of a threshold value comprises:

calculating a length of at least one second alarm signal that is generated using the sensor signal that is received from the sensor;

calculating an average and a standard deviation of a length of the at least one second alarm signal for an initialization period; and setting the threshold value using the average and the standard deviation.

11. The method of claim 8, wherein the initial condition comprises a condition in which only noise exists without the object.

12. A method in which a sensor signal processing apparatus processes a sensor signal of a sensor in order to detect an object, the method comprising:

receiving a sensor signal from the sensor;

generating, when it is determined that the object exists from the sensor signal, an alarm signal; and removing an alarm signal corresponding to a false alarm signal from the alarm signal, wherein the removing of an alarm signal comprises:

setting a threshold value using a sensor signal that is received from the sensor in an initial condition for an initialization period;

calculating energy of at least one first alarm signal that is generated using a sensor signal that is received from the sensor after the initialization period; and determining a first alarm signal having smaller energy than the threshold value as the false alarm signal.

13. The method of claim 12, wherein the setting of a threshold value comprises:

calculating energy of a plurality of sample signals of at least one second alarm signal that is generated using the sensor signal that is received from the sensor;

calculating an average and a standard deviation of energy of a plurality of sample signals for an initialization period; and setting the threshold value using the average and the standard deviation.

14. The method of claim 13, wherein the initial condition comprises a condition in which only noise exists without the object.

* * * * *